(12) United States Patent
Hwang et al.

(10) Patent No.: US 6,852,450 B2
(45) Date of Patent: Feb. 8, 2005

(54) ELECTROLYTE FOR A LITHIUM-SULFUR BATTERY AND A LITHIUM-SULFUR BATTERY USING THE SAME

(75) Inventors: Duck Chul Hwang, Cheonan (KR); Yun Suk Choi, Cheonan (KR); Soo Seok Choi, Cheonan (KR); Jea Woan Lee, Cheonan (KR); Yong Ju Jung, Taejeon (KR); Joo Soak Kim, Cheonan (KR)

(73) Assignee: Samsung SDI Co., Ltd., Suwon-Si (KR)

( * ) Notice: Subject to any disclaimer, the term of this patent is extended or adjusted under 35 U.S.C. 154(b) by 359 days.

(21) Appl. No.: 09/911,083

(22) Filed: Jul. 24, 2001

(65) Prior Publication Data

US 2002/0045101 A1 Apr. 18, 2002

(30) Foreign Application Priority Data

Jul. 25, 2000 (KR) .......................................... 2000-42735
Aug. 17, 2000 (KR) .......................................... 2000-47348

(51) Int. Cl.$^7$ ........................... H01M 10/08; H01M 6/16
(52) U.S. Cl. .................. 429/326; 429/327; 429/231.95
(58) Field of Search ................................. 429/326, 327

(56) References Cited

U.S. PATENT DOCUMENTS

| 5,030,528 | A | * | 7/1991 | Shen ............................ 429/197 |
| 5,437,945 | A | * | 8/1995 | Omaru ......................... 429/197 |
| 5,523,179 | A |   | 6/1996 | Chu |
| 5,552,244 | A | * | 9/1996 | Griffin .......................... 429/188 |
| 5,571,635 | A | * | 11/1996 | Shu .............................. 429/194 |
| 5,578,395 | A | * | 11/1996 | Yoshimura .................. 429/197 |
| 5,750,284 | A | * | 5/1998 | Pendalwar ................... 429/197 |
| 5,814,420 | A |   | 9/1998 | Chu |
| 5,961,672 | A |   | 10/1999 | Skotheim et al. |
| 6,017,651 | A |   | 1/2000 | Nimon et al. |
| 6,025,094 | A |   | 2/2000 | Visco et al. |
| 6,030,720 | A |   | 2/2000 | Chu et al. |
| 6,465,134 | B1 | * | 10/2002 | Shibuya ....................... 429/300 |
| 6,506,524 | B1 | * | 1/2003 | McMillan .................... 429/324 |

* cited by examiner

*Primary Examiner*—Mark Ruthkosky
(74) *Attorney, Agent, or Firm*—Staas & Halsey LLP

(57) ABSTRACT

An electrolyte for a lithium-sulfur battery that includes a first component solvent with a sulfur solubility greater than or equal to 20 mM, a second component solvent with a sulfur solubility less than 20 mM, a third component solvent with a high dielectric constant and a high viscosity, and an electrolyte salt. This battery shows excellent capacity and cycle life characteristics.

29 Claims, 2 Drawing Sheets

ELECTROLYTE FOR A LITHIUM-SULFUR BATTERY AND A LITHIUM-SULFUR BATTERY USING THE SAME

CROSS-REFERENCE TO RELATED APPLICATIONS

This application is based on Korean Patent Application Nos. 2000-42735 and 2000-47348 filed in the Korean Industrial Property Office, respectively, on Jul. 25, 2000 and Aug. 17, 2000, the contents of which are incorporated herein by reference.

BACKGROUND OF THE INVENTION

1. Field of the Invention

The present invention relates to an electrolyte for a lithium-sulfur battery and a lithium-sulfur battery using the same, and more specifically, to an electrolyte for a lithium-sulfur battery prepared by mixing at least two solvents with different sulfur solubilities, and another solvent with a high dielectric constant and a high viscosity, and a lithium-sulfur battery using the same.

2. Description of the Related Art

Due to the rapid development of portable electronic equipment, there are growing demands for secondary batteries. Recently, coinciding with the trend toward compact, thin, small and light portable electronic equipment, there is growing need for a battery with a high energy density. Thus, it is necessary to develop a battery with good safety, economy, and which is also environmentally-friendly.

Of the batteries satisfying the above requirements, a lithium-sulfur battery is the most useful in terms of energy density. The energy density of lithium is 3830 mAh/g used as a negative active material, and the energy density of sulfur ($S_8$) used as a positive active material is 1675 mAh/g. These active materials are both cheap and environmentally friendly. However, there is still little widespread use of the lithium-sulfur battery system.

The reason as to why there is still little widespread use of the lithium-sulfur battery is because of the amount of sulfur used in electrochemical reduction/oxidation (redoxidation) in a battery as compared to the amount of introduced sulfur is very low. That is to say, the sulfur utilization is very low so that there is very low battery capacity when the sulfur is used as active material.

In addition, during redoxidation, the sulfur leaks into the electrolyte so that the cycle life of a battery deteriorates. Also, when a proper electrolyte is not selected, the lithium sulfide ($Li_2S$) (i.e., the reduced material of sulfur) is deposited so that it can no longer participate in the electrochemical reaction.

U.S. Pat. No. 5,961,672 discloses a mixed electrolyte solution of 1,3-dioxolane/diglyme/sulforane/dimethoxyethane in a ratio of 50/20/10/20 comprising 1M of $LiSO_3CF_3$ in order to improve the cycle life and safety, and a negative electrode of lithium metal coated with a polymer.

U.S. Pat. Nos. 5,523,179, 5,814,420, and 6,030,720 suggest technical improvements to solve the above-noted problems. U.S. Pat. No. 6,030,720 discloses a mixed solvent comprising a main solvent having a general formula $R_1(CH_2CH_2O)_nR_2$ (where n ranges between 2 and 10, and $R_1$ and $R_2$ are different or identical alkyl or alkoxy groups) and a cosolvent having a donor number of at least about 15. In addition, the above patent uses a liquid electrolyte solvent comprising at least one donor solvent such as a crown ether or a cryptand, and eventually the electrolyte turns to a catholyte after discharging. The patent discloses that the separation distance, defined as the boundaries of the region where the cell catholyte resides, is less than 400 µm.

Meanwhile, there is still a need to solve the problem of the reduced cycle life of the battery caused by using lithium metal as a negative electrode. The reason for the cycle life deterioration is that as the charging/discharging cycles are repeated, dendrite that is formed from the deposition of metal lithium at the surface of the lithium negative electrode grows and reaches to the surface of the positive electrode so that it causes a short circuit. In addition, the lithium corrosion due to a reaction of the lithium surface and the electrolyte occurs to reduce the battery capacity.

In order to solve these problems, U.S. Pat. Nos. 6,017,651, 6,025,094, and 5,961,672 disclose a technique of forming a protective layer on the surface of the lithium electrode. The requirements for the protective layer to work well are the free transfer of the lithium ions and the inhibition of contact between the lithium and the electrolyte. However, the conventional methods of forming the protective layer have some problems. Most of the lithium protective layers are formed by the reaction of an additive in the electrolyte and the lithium after fabricating a battery. However, since this method does not form a dense layer, a lot of the electrolyte permeates the protective layer and contacts the lithium metal.

Also, another conventional method includes forming a lithium nitride ($Li_3N$) layer on the surface of the lithium by reacting nitrogen plasma at the surface of lithium. However, this method also has problems in that the electrolyte permeates through the grain boundary, the lithium nitride layer is likely to decompose due to moisture, and the potential window is very low (0.45V) so that it is difficult to use practically.

SUMMARY OF THE INVENTION

To solve these and other problems, it is an object of the present invention to provide an electrolyte for a lithium-sulfur battery prepared by mixing at least two solvents with different sulfur solubilities and another solvent with a high dielectric constant and a high viscosity in order to improve a cycle life and capacity characteristics of the lithium-sulfur battery.

It is another object of the present invention to provide a lithium-sulfur battery using the electrolyte.

Additional objects and advantages of the invention will be set forth in part in the description which follows and, in part, will be obvious from the description, or may be learned by practice of the invention.

In order to achieve the above and other objects, an electrolyte for a lithium-sulfur battery according to an embodiment of the present invention includes a first component solvent with a sulfur solubility above 20 mM, a second component solvent with a sulfur solubility below 20 mM, a third component solvent with a high dielectric constant and a high viscosity, and an electrolyte salt.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
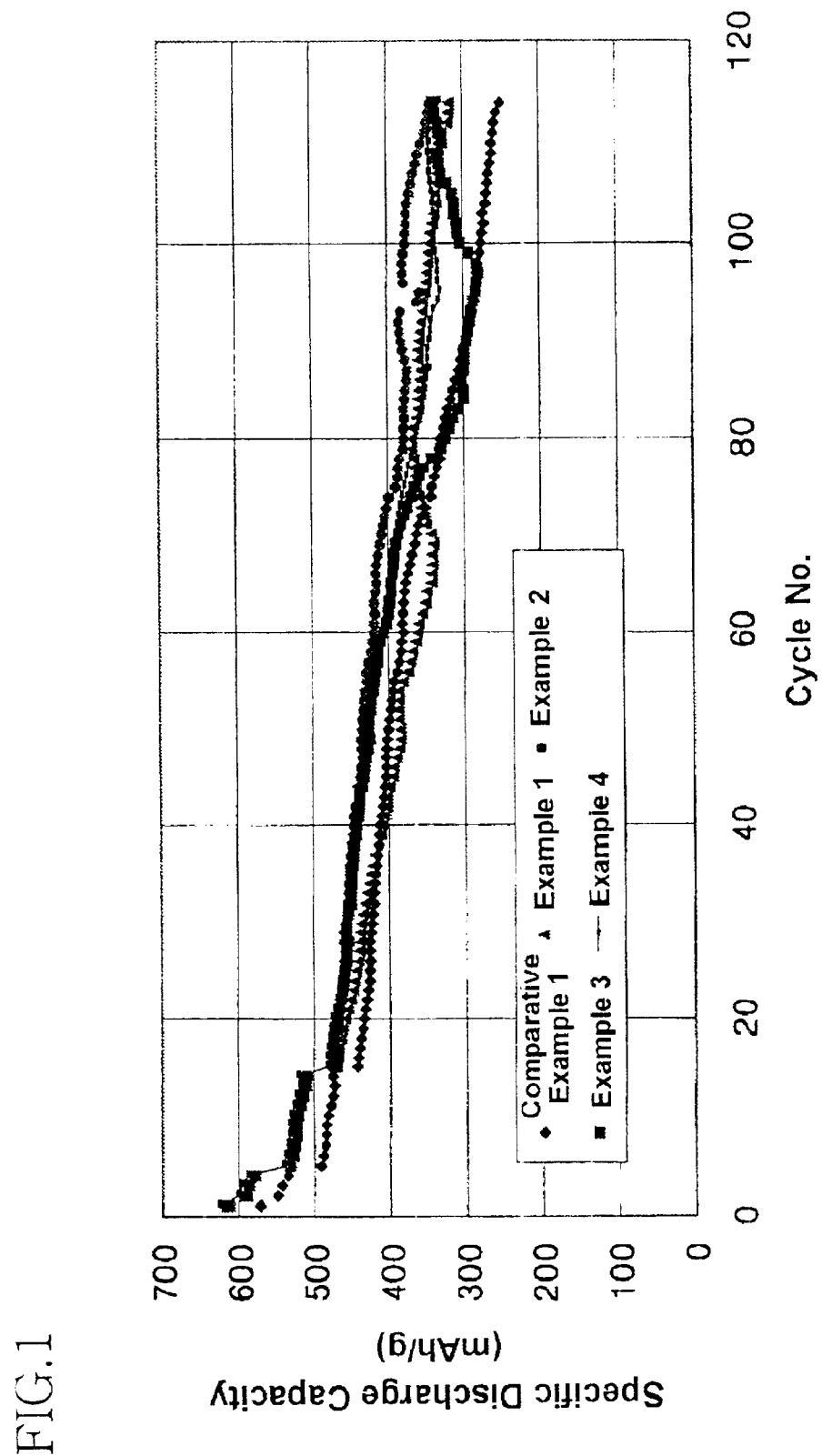
FIG. 1 is a graph illustrating specific discharge capacities of lithium-sulfur batteries according to embodiments of the present invention for the electrolytes of Examples 1 to 4 and Comparative Example 1.

Reference will now be made in detail to the present preferred embodiments of the present invention, examples of which are illustrated in the accompanying drawings and described in the accompanying examples, wherein like reference numerals refer to the like elements throughout. The embodiments are described below in order to explain the present invention by referring to the figures and the examples.

Generally, since a lithium-sulfur battery uses a sulfur-based compound such as an active sulfur ($S_8$), a lithium sulfide ($Li_2S$), and a lithium polysulfide ($Li_2S_n$, n=2, 4, 6, or 8) as a positive active material, a solvent should be able to dissolve these positive active materials well. The electrolyte according to an embodiment of the present invention includes a first component solvent with sulfur solubility greater than or equal to 20 mM, a second component solvent with a sulfur solubility less than 20 mM, a third component solvent with a high dielectric constant and a high viscosity, and an electrolyte salt.

The electrolyte has been chosen by selecting solvents with different sulfur solubility through experimentation by measuring the solubility of sulfur, and combining the selected solvents. The sulfur solubility of the solvents has been evaluated by the following method. 10 mg of sulfur powder is added to each solvent and agitated for 10 minutes. If the sulfur powder dissolves completely, then an additional 10 mg of sulfur powder is added, and this procedure is conducted repeatedly. When a portion of added sulfur powder does not dissolve, the non-dissolved sulfur is recovered through filtration with a filter paper, and the mass of the filtered sulfur is measured. The sulfur solubility of the solvent is calculated from the mass of the non-dissolved sulfur. The sulfur solubilities of the experimented solvents are shown in the Table 1.

TABLE 1

| No. | Solvent | Non-dissolved sulfur (mg) | Sulfur solubility (mM) |
| --- | --- | --- | --- |
| 1 | Benzene | 900 | 87.9 |
| 2 | Fluorobenzene | 850 | 83.0 |
| 3 | Toluene | 860 | 84.0 |
| 4 | Trifluorotoluene | 800 | 78.1 |
| 5 | Xylene | 790 | 77.1 |
| 6 | Cyclohexane | 950 | 92.8 |
| 7 | Tetrahydrofurane (THF) | 490 | 47.9 |
| 8 | 2-methyl tetrahydrofurane (2-MeTHF) | 450 | 43.9 |
| 9 | Cyclohexanone | 80 | 7.8 |
| 10 | Ethanol (EtOH) | 9 | 0.9 |
| 11 | Isopropanol | 10 | 1.0 |
| 12 | Dimethyl carbonate (DMC) | 8 | 0.8 |
| 13 | Ethylmethyl carbonate (EMC) | 8 | 0.8 |
| 14 | Diethyl carbonate (DEC) | 8 | 0.8 |
| 15 | Methylpropyl carbonate (MPC) | 8 | 0.8 |
| 16 | Methyl propionate (MP) | 15 | 1.5 |
| 17 | Ethyl propionate (EP) | 16 | 1.6 |
| 18 | Methyl acetate (MA) | 15 | 1.5 |

TABLE 1-continued

| No. | Solvent | Non-dissolved sulfur (mg) | Sulfur solubility (mM) |
| --- | --- | --- | --- |
| 19 | Ethyl acetate (EA) | 15 | 1.5 |
| 20 | Propyl acetate (PA) | 16 | 1.6 |
| 21 | Dimethoxy ethane (DME) | 13 | 1.3 |
| 22 | 1,3-dioxolane (DOXL) | 16 | 1.6 |
| 23 | Diglyme (DGM) | 15 | 1.5 |
| 24 | Tetraglyme (TGM) | 14 | 1.4 |

As shown in Table 1 above, a solvent having a sulfur solubility greater than or equal to 20 mM for use as the first component of the electrolyte includes benzene, fluorobenzene, toluene, trifluorotoluene, xylene, cyclohexane, tetrahydrofurane, and 2-methyl tetrahydrofurane.

A solvent having a sulfur solubility less than 20 mM for use as the second component of the electrolyte includes cyclohexanone, ethanol, isopropanol, dimethyl carbonate, ethylmethyl carbonate, diethyl carbonate, methylpropyl carbonate, methyl propionate, ethyl propionate, methyl acetate, ethyl acetate, propyl acetate, dimethoxy ethane, 1,3-dioxolane, diglyme (2-methoxyethyl ether), and tetraglyme.

It is preferable that the difference in the sulfur solubility between the first component solvent and the second component solvent is more than 20 mM.

The above solvents in Table 1 are exemplified solvents. It is understood that other solvents having sulfur solubility within the range of the present invention can be used.

A solvent with a high dielectric constant and a viscosity for use as the third component of the electrolyte includes ethylene carbonate, propylene carbonate, γ-butyrolactone, sulforane and so on.

There are six species of sulfur-based compounds generated during the repetition of the charging/discharging cycles of the lithium-sulfur battery. Among them, sulfur has a relatively lower polarity, but lithium sulfide and lithium polysulfide ($Li_2S_n$, n=2, 4, 6, or 8) are ionic compounds having a high polarity. Thus, it is preferable that an amount of the first component is smaller than that of the second component in consideration of the total solubility of the sulfur-based compound.

In this regard, it is preferable to use roughly between 5% and 30% by volume of the first component solvent. It is preferable to be within the above ranges in order to improve entire solubility of sulfur-based compounds. For example, if less than 5% by volume is used, the electrolyte has a good solubility of the sulfur, but poor solubility of the lithium (poly) sulfide.

An amount of the second component solvent is preferably roughly between 20% and 70% by volume, and more preferably roughly between 20% and 50% by volume. It is preferable to be within the above ranges in order to improve the entire solubility of the sulfur-based compounds.

An amount of the third component solvent is preferably roughly between 20% and 70% by volume, and more preferably, roughly between 20% and 50% by volume. It is preferable to be within the above range in order to improve the characteristics of the electrolyte. For example, since the third component solvent is very viscous, if it is used for more than 70% by volume, the discharge capacity abruptly decreases. In addition, since the third solvent has a high polarity, it is not likely to impregnate in a separator with a low polarity. The difficulty of impregnation may also reduce the discharge capacity where the third solvent is used more than 70% by volume.

The third component solvent has a high polarity, and, while it becomes a very good electrolyte solvent, ethylene carbonate and sulforane are in a solid state at room temperature. In order to compensate for the above disadvantage, the second component solvent having a low viscosity is used with the third component solvent.

The relative amount of the second and third component solvents used in the electrolyte of the present invention are determined in terms of the viscosity and the dielectric constant. Generally, it is preferable not to use excessively one of the second and third solvents and it is preferable to use them in a ratio of 1:1 or other more balanced ratios.

The electrolyte also includes electrolyte salts. Examples of the electrolyte salts are hexafluorophosphate ($LiPF_6$), lithium tetrafluoroborate ($LiBF_4$), lithium hexafluoroarsenate ($LiAsF_6$), lithium perchlorate ($LiClO_4$), lithium trifluoromethane sulfonyl imide ($LiN(CF_3SO_2)_2$), and lithium trifluorosulfonate ($CF_3SO_3Li$), but is understood that the electrolyte salts are not limited to these. The concentration of the electrolyte salt is preferably roughly between 0.5 M and 2.0 M.

Meanwhile, according to an embodiment of the present invention, it is possible to improve the cycle life of the lithium-sulfur battery by further adding an additive gas that forms a solid electrolyte interface (SEI) on the surface of a negative electrode. The additive gas is at least one selected from the group consisting of $CO_2$, $SO_2$, $N_2O$ and mixtures thereof. The amount of the additive gas is preferably roughly between 0.2% and 10% by weight, and more preferably roughly between 0.5% and 5.0% by weight based on the electrolyte. When the amount of the additive gas is less than 0.2% by weight, the additive effect is little. When the amount of the additive gas is more than 10% by weight, the effect does not improve any more.

In a lithium-sulfur battery, during the charging/discharging, one of the factors affecting cycle life is a formation of dendrite on a surface of a lithium metal of the negative electrode. As the charging/discharging cycles repeat, the dendrite is formed on the surface of the lithium metal, which causes a short circuit as well as reduces the cycle life of the battery.

The additive gas in the electrolyte according to an embodiment of the present invention prevents the formation of the dendrite, accelerates the formation of the SEI film on the surface of the negative electrode, and thus improves the cycle life of the lithium-sulfur batteries. That is, during charging/discharging, the electrolyte decomposes on the negative electrode to form the SEI film, which prevents the formation of the dendrite and side-reactions on the surface of the negative electrode so that it improves the cycle life.

A lithium-sulfur battery according to an embodiment of the present invention uses the above electrolyte. Examples of the negative active material of the lithium-sulfur battery are preferably a lithium metal, a lithium-containing alloy, a combination electrode of lithium/inactive sulfur, a compound that can reversibly intercalate lithium ion, and a compound that can reversibly redoxidate (i.e., have an oxidation reduction) with a lithium ion at the lithium surface.

The lithium-containing alloy is a lithium/aluminum alloy or a lithium/tin alloy. During the charging/discharging, the sulfur used as a positive active material turns into an inactive sulfur that adheres to the surface of the lithium negative electrode. The inactive sulfur refers to the sulfur that cannot participate in the electrochemical reaction of the positive electrode any longer after various electrochemical or chemical reactions. The inactive sulfur formed on the surface of the lithium negative electrode has a benefit as a protective layer for the lithium negative electrode. Thus, the combination electrode of the lithium metal and the inactive sulfur formed on the lithium metal can be used as a negative electrode. The compound that can reversibly intercalate the lithium ion is a carbon material, or can be any carbon negative active material generally used in a lithium ion secondary battery. Examples of this include crystalline carbon, amphorous carbon, or a combination thereof. The compound that can reversibly redoxidate with the lithium ion is titanium nitrate or a silicon compound, but is understood not to be limited to these.

The positive active material of the lithium-sulfur battery is preferably at least one selected from the group consisting of a sulfur element, $Li_2S_n$ ($n \geq 1$), $Li_2S_n$ ($n \geq 1$) dissolved in a catholyte, an organic sulfur compound, and a carbon-sulfur polymer (($C_2S_x)_n$ where x=2.5 to 50 and $n \geq 2$).

The present invention is further explained in more detail with reference to the following examples. These examples, however, should not in any sense be interpreted as limiting the scope of the present invention and the equivalents thereof.

EXAMPLES 1 TO 4 AND COMPARATIVE EXAMPLE 1

60% of elemental sulfur, 20% of super P conductive material and 20% of poly(vinyl acetate) were mixed in an acetonitrile solvent until a slurry was evenly mixed. The slurry was coated on an Al current collector coated with carbon to form a coated positive electrode. Before fabricating the coated positive electrode, it was dried for more than 12 hours under a vacuum. The positive electrode and a vacuum-dried separator were transferred to a glove box. A proper amount of electrolyte including 1 M of $LiSO_3CF_3$ as a salt was dropped on the positive electrode. The separator was placed on the positive electrode, a small amount of the electrolyte was added, and the lithium electrode was placed thereon. After staying 24 hours at room temperature, the fabricated batteries underwent charging/discharging for 1 cycle at 0.1 C, 3 cycles at 0.2 C, 5 cycles at 0.5 C, and 100 cycles at 1.0 C under 1.5 V to 2.8V of cut-off voltage. The composition of the electrolyte and the result of the charging/discharging cycles are shown in Table 2.

TABLE 2

| | Electrolyte (Ratio) | Cycle life characteristic (100 cycles/initial) % | Initial discharge capacity (mAh/g) |
|---|---|---|---|
| Example 1 | Trifluorotoluene/propylene carbonate/dimethyl carbonate (20/40/40) | 52% | 612 |

TABLE 2-continued

| | Electrolyte (Ratio) | Cycle life characteristic (100 cycles/initial) % | Initial discharge capacity (mAh/g) |
|---|---|---|---|
| Example 2 | Tetrahydrofurane/propylene carbonate/dimethyl carbonate (20/40/40) | 58% | 620 |
| Example 3 | 2-methyl tetrahydrofurane/propylene carbonate/dimethyl carbonate (20/40/40) | 60% | 617 |
| Example 4 | Toluene/γ-butyrolactone/dimethoxy ethane (20/40/40) | 53% | 625 |
| Com. Example 1 | 1,3-dioxolane/diglyme/ sulforane/dimethoxy ethane (50/20/10/20) | 44% | 571 |

Comparing Examples 1 to 4 with Comparative Example 1, the initial discharge capacity of the battery prepared in Comparative Example 1 is 571 mAh/g, which is 7% to 9% lower than those of Examples 1 to 4. The cycle life characteristic of the batteries of Examples 1 to 4 is 8% to 16% higher than that of Comparative Example 1. These results are shown in FIG. 1.

As indicated in Table 2 and in FIG. 1, Examples 1 to 4 have better capacity and cycle life characteristics as compared to those of Comparative Example 1. This is because the first component solvents (i.e., the benzene, tetrahydrofurane, and substituted derivatives thereof) increase the solubility of the sulfur with the low polarity. In contrast, the electrolyte of the Comparative Example 1, which lacks the first component solvent having the lower sulfur solubility, has a decreased capacity and cycle life characteristics.

Comparing Examples 1 and 4 with Examples 2 and 3, the kind of the first component solvent used affects the performance of the battery. Tetrahydrofurane or derivative thereof used in Examples 2 and 3 have a better solubility of the electrolyte salt than the benzene or benzene derivatives used in Examples 1 and 4. Thus, these transfer the lithium ions better and the batteries of Examples 2 and 3 and have a more improved performance than those of Examples 1 and 4.

EXAMPLES 5 TO 7 AND COMPARATIVE EXAMPLE 2

Figure 2:
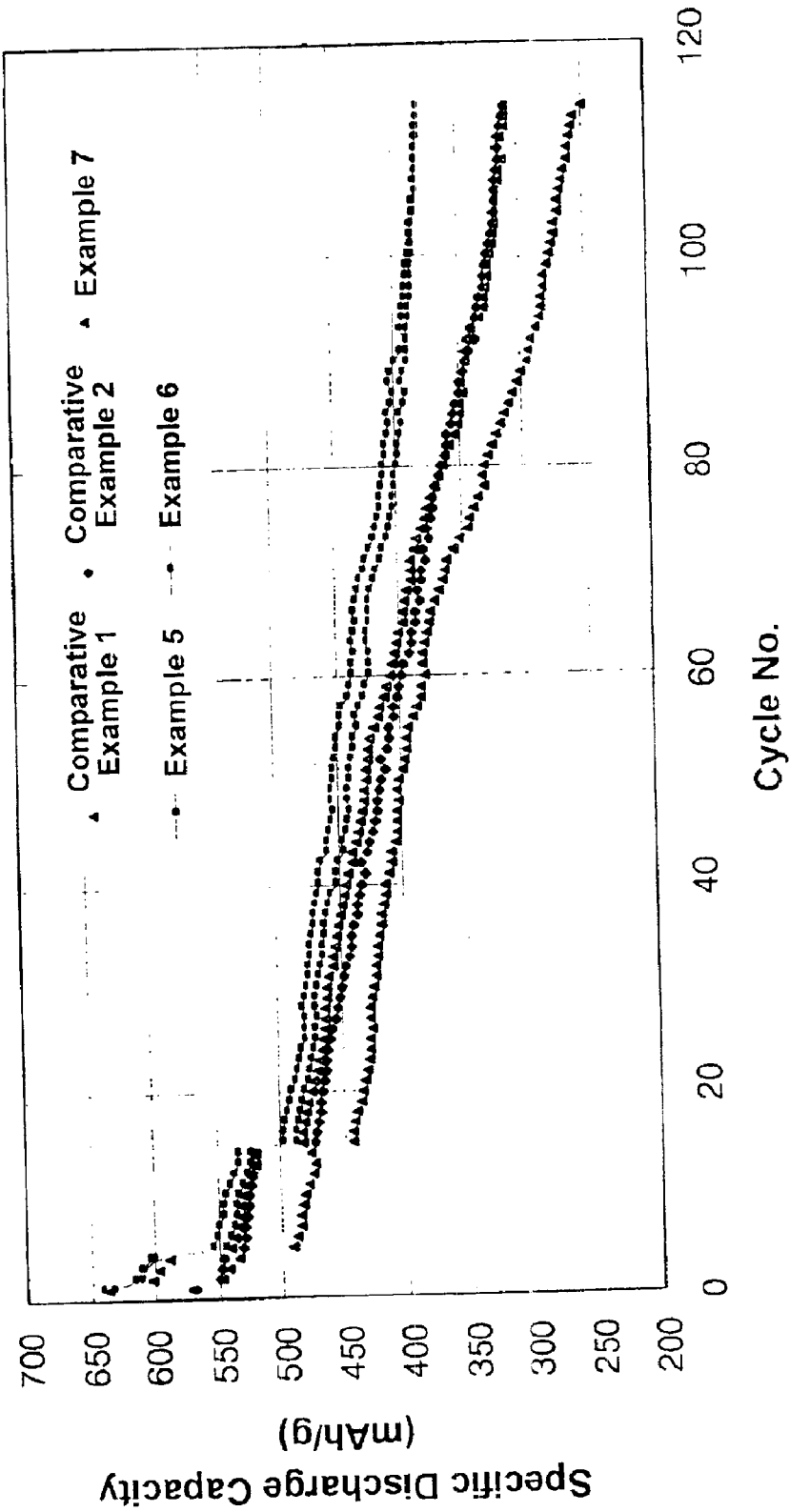
FIG. 2 is a graph illustrating specific discharge capacities of lithium-sulfur batteries according to embodiments of the present invention for the electrolytes of Examples 5 to 7 and Comparative Examples 1 and 2.

The batteries were fabricated according to the same method as in Examples 1 to 4, except that the electrolyte was used as in the following composition of Table 3. After staying 24 hours at room temperature, the fabricated batteries were underwent charging/discharging for 1 cycle at 0.1 C, 3 cycles at 0.2 C, 5 cycles at 0.5 C and 100 cycles at 1.0 C under 1.5 V to 2.8V of cut-off voltage. The results are shown in Table 3 and in FIG. 2.

TABLE 3

| | Electrolyte (Ratio) | Additive gas (content, wt %) | Cycle life characteristic (100 cycles/ initial) % | Initial discharge capacity (mAh/g) |
|---|---|---|---|---|
| Example 5 | 2-MeTHF*/ethylene carbonate/dimethyl carbonate (20/40/40) | $CO_2$ (2 wt %) | 60% | 632 |
| Example 6 | 2-MeTHF*/ethylene carbonate/dimethyl carbonate (20/40/40) | $SO_2$ (2 wt %) | 59% | 640 |
| Example 7 | 2-MeTHF*/ethylene carbonate/dimethyl carbonate (20/40/40) | — | 49% | 635 |
| Com. Example 2 | 1,3-dioxolane/ diglyme/sulforane/ dimethoxyethane (50/20/10/20) | $CO_2$ (2 wt %) | 55% | 568 |

*2-MeTHF: 2-methyl tetrahydrofurane

Comparing Comparative Example 1, which does not contain $CO_2$, with Comparative Example 2, which contains $CO_2$, the cycle life of Comparative Example 2 (55%) improved about 11% more than that of Comparative Example 1 (44%) due to the SEI formed by the additive gas. However, the initial discharge capacity did not increase. Thus, the increase in the battery capacity is more highly affected by a composition of the electrolyte than by the addition of an additive gas.

Examples 5 to 7, which contain additive gases and have electrolyte composition according to an embodiment of the present invention, have an excellent cycle life characteristic and an excellent initial capacity characteristic. This is because the additive gases prevent a formation of the dendrite by forming an SEI on the surface of the lithium negative electrode during the charging and prevent sidereactions at the lithium negative surface.

Therefore, lithium-sulfur batteries prepared by using electrolyte according to the present invention improve the initial discharge capacity and cycle life characteristic.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrolyte for a lithium-sulfur battery having a positive and a negative electrode, comprising:

a first component solvent with a sulfur solubility greater than or equal to 20 mM;

a second component solvent with a sulfur solubility less than 20 mM;

a third component solvent having a high dielectric constant and a high viscosity and an electrolyte salt,
wherein
said first component solvent is substantially between 5% and 30% by volume of the electrolyte,
said second component solvent is substantially between 20% and 70% by volume of the electrolyte, and
said third component solvent is substantially between 20% and 70% by volume of the electrolyte.

2. The electrolyte for the lithium-sulfur battery of claim 1, wherein a difference in sulfur solubility between said first component solvent and said second component solvent is more than 20 mM.

3. The electrolyte for the lithium-sulfur battery of claim 1, wherein said second component solvent and said third component solvent are mixed in a ratio of 1:1.

4. The electrolyte for the lithium-sulfur battery of claim 1, wherein said first component solvent is at least one selected from a group consisting of benzene, fluorobenzene, toluene, trifluorotoluene, xylene, cyclohexane, tetrahydrofurane, and 2-methyl tetrahydrofurane.

5. The electrolyte for the lithium-sulfur battery of claim 1, wherein said second component solvent is at least one selected from a group consisting of cyclohexanone, ethanol, isopropanol, dimethyl carbonate, ethylmethyl carbonate, diethyl carbonate, methylpropyl carbonate, methyl propionate, ethyl propionate, methyl acetate, ethyl acetate, propyl acetate, dimethoxy ethane, 1,3-dioxolane, diglyme (2-methoxyethyl ether), and tetraglyme.

6. The electrolyte for the lithium-sulfur battery of claim 1, wherein said third component solvent is at least one selected from a group consisting of ethylene carbonate, propylene carbonate, γ-butyrolactone, and sulforane.

7. The electrolyte for the lithium-sulfur battery of claim 1, wherein said electrolyte salt is at least one selected from a group consisting of lithium hexafluorophosphate, lithium tetrafluoroborate, lithium hexafluoroarsenate, lithium perchlorate, lithium trifluoromethane sulfonylimide, and lithium trifluorosulfonate.

8. The electrolyte for the lithium-sulfur battery of claim 7, wherein a concentration of said electrolyte salt is substantially between 0.5 M and 2.0 M.

9. An electrolyte for a lithium-sulfur battery having a positive and a negative electrode, comprising:
a first component solvent with a sulfur solubility greater than or equal to 20 mM;
a second component solvent with a sulfur solubility less than 20 mM;
a third component solvent having a high dielectric constant and a high viscosity;
an electrolyte salt; and
an additive gas which forms a solid electrolyte interface (SEI) at a surface of the negative electrode during charging.

10. The electrolyte for the lithium-sulfur battery of claim 9, wherein said additive gas is at least one selected from a group consisting of $CO_2$, $SO_2$ and $N_2O$.

11. The electrolyte for the lithium-sulfur battery of claim 9, wherein said additive gas is substantially between 0.2% and 10% by weight of the electrolyte.

12. A lithium-sulfur battery comprising:
a negative electrode comprising a negative active material selected from a group consisting of lithium metal, lithium-containing alloy, a combination electrode of lithium/inactive sulfur, a compound that reversibly intercalates a lithium ion, and a compound that reversibly redoxidates with the lithium ion at a surface;
an electrolyte comprising:
a first component solvent with a sulfur solubility greater than or equal to 20 mM;
a second component solvent with a sulfur solubility less than 20 mM;
a third component solvent with a high dielectric constant and a high viscosity, and an electrolyte salt; and
a positive electrode comprising a positive active material comprising at least one sulfur-based material selected from a group consisting of sulfur element, $Li_2S_n$(n 1), organic sulfur compound and carbon-sulfur polymer $((C_2S_x)_n$ where x=2.5 to 50 and n 2), and electrically conductive material,
wherein said electrolyte further comprises an additive to prevent the formation of dendrite on a surface of said negative electrode.

13. An electrolyte for use in a lithium-sulfur battery, comprising:
a mixture of solvents having different sulfur solubilities to dissolve sulfur and sulfur compounds, the sulfur compounds having a higher polarity than a polarity of the sulfur;
a high dielectric solvent having a high dielectric constant; and
an electrolyte salt,
wherein said mixture comprises a first solvent with a sulfur solubility greater than or equal to 20 mM and a second solvent with a sulfur solubility less than 20 mM,
the first solvent is substantially between 5% and 30% by volume of the electrolyte,
the second solvent is substantially between 20% and 70% by volume of the electrolyte, and
said high dielectric solvent is substantially between 20% and 70% by volume of the electrolyte.

14. The electrolyte of claim 13, wherein said mixture comprises first and second solvents, wherein a relative amount of the first and second solvents is determined in accordance with a relative amount of the sulfur and the sulfur compounds.

15. The electrolyte of claim 14, wherein a relative amount of the second solvent and said high dielectric solvent is determined in accordance with the dielectric constants and viscosities of the second solvent and said high dielectric solvent.

16. The electrolyte of claim 13, wherein a difference in the sulfur solubility between the first solvent and the second solvent is more than 20 mM.

17. The electrolyte of claim 13, wherein one of the solvents of said mixture is at least one selected from a group consisting of benzene, fluorobenzene, toluene, trifluorotoluene, xylene, cyclohexane, tetrahydrofurane, and 2-methyl tetrahydrofurane.

18. The electrolyte of claim 13, one of the solvents of said mixture is at least one selected from a group consisting of cyclohexanone, ethanol, isopropanol, dimethyl carbonate, ethylmethyl carbonate, diethyl carbonate, methylpropyl carbonate, methyl propionate, ethyl propionate, methyl acetate, ethyl acetate, propyl acetate, dimethoxy ethane, 1,3-dioxolane, diglyme (2-methoxyethyl ether), and tetraglyme.

19. The electrolyte of claim 13, wherein said high dielectric solvent is at least one selected from a group consisting of ethylene carbonate, propylene carbonate, γ-butyrolactone, and sulforane.

20. An electrolyte for use in a lithium-sulfur battery, comprising:
a mixture of solvents having different sulfur solubilities to dissolve sulfur and sulfur compounds, the sulfur compounds having a higher polarity than a polarity of the sulfur;

a solvent having a high dielectric constant; and
an electrolyte salt,
wherein said mixture comprises:
a first solvent with a sulfur solubility greater than or equal to 20 mM; and
a second solvent with a sulfur solubility less than 20 mM, and
wherein:
the first solvent is substantially between 5% and 30% by volume of the electrolyte,
the second solvent is substantially between 20% and 70% by volume of the electrolyte, and
the solvent having a high dielectric constant is substantially between 20% and 70% by volume of the electrolyte.

21. A lithium-sulfur battery, comprising:
a negative electrode comprising a negative active material;
an electrolyte comprising:
a mixture of solvents having different sulfur solubilities to dissolve sulfur and sulfur compounds, the sulfur compounds having a higher polarity than a polarity of the sulfur;
a solvent having a high dielectric constant; and
an electrolyte salt; and
a positive electrode comprising a positive active material,
wherein said electrolyte further comprises an additive to prevent the formation of dendrite on a surface of said negative electrode.

22. The battery of claim 21, wherein the mixture comprises first and second solvents, where a relative amount of the first and second solvents is determined in accordance with a relative amount of the sulfur and the sulfur compounds.

23. The battery of claim 22, a relative amount of the second solvent and the high dielectric solvent is determined in accordance with the dielectric constants and viscosities of the second solvent and the high dielectric solvent.

24. The battery of claim 21, wherein the difference in the sulfur solubility between the first solvent and the second solvent is more than 20 mM.

25. The battery of claim 21, wherein one of the solvents of the mixture is at least one selected from a group consisting of benzene, fluorobenzene, toluene, trifluorotoluene, xylene, cyclohexane, tetrahydrofurane, and 2-methyl tetrahydrofurane.

26. The battery of claim 21, wherein one of the solvents of the mixture is at least one selected from a group consisting of cyclohexanone, ethanol, isopropanol, dimethyl carbonate, ethylmethyl carbonate, diethyl carbonate, methylpropyl carbonate, methyl propionate, ethyl propionate, methyl acetate, ethyl acetate, propyl acetate, dimethoxy ethane, 1,3-dioxolane, diglyme (2-methoxyethyl ether), and tetraglyme.

27. The battery of claim 21, wherein the high dielectric solvent is at least one selected from a group consisting of ethylene carbonate, propylene carbonate, $\gamma$-butyrolactone, and sulforane.

28. A lithium-sulfur battery, comprising:
a negative electrode comprising a negative active material;
an electrolyte comprising:
a mixture of solvents having different sulfur solubilities to dissolve sulfur and sulfur compounds, the sulfur compounds having a higher polarity than a polarity of the sulfur;
a solvent having a high dielectric constant;
an electrolyte salt; and
an additive to form a solid electrolyte interface on a lithium metal surface of said negative electrode; and
a positive electrode comprising a positive active material.

29. A lithium-sulfur battery, comprising:
a negative electrode comprising a negative active material;
an electrolyte comprising:
a mixture of solvents having different sulfur solubilities to dissolve sulfur and sulfur compounds, the sulfur compounds having a higher polarity than a polarity of the sulfur;
a solvent having a high dielectric constant; and
an electrolyte salt; and
a positive electrode comprising a positive active material,
wherein the mixture comprises:
a first solvent with a sulfur solubility greater than or equal to 20 mM; and
a second solvent with a sulfur solubility less than 20 mM, and
wherein:
the first solvent is substantially between 5% and 30% by volume of said electrolyte,
the second solvent is substantially between 20% and 70% by volume of said electrolyte, and
the solvent having the high dielectric constant is substantially between 20% and 70% by volume of said electrolyte.

* * * * *

UNITED STATES PATENT AND TRADEMARK OFFICE
CERTIFICATE OF CORRECTION

PATENT NO. : 6,852,450 B2
DATED : February 8, 2005
INVENTOR(S) : Duck Chul Hwang et al.

It is certified that error appears in the above-identified patent and that said Letters Patent is hereby corrected as shown below:

Column 10,
Line 50, insert -- wherein -- after ",".

Column 11,
Line 36, insert -- wherein -- after ",".

Signed and Sealed this

Ninth Day of August, 2005

JON W. DUDAS
*Director of the United States Patent and Trademark Office*